(12) United States Patent
Jayaram

(10) Patent No.: US 9,299,099 B1
(45) Date of Patent: Mar. 29, 2016

(54) PROVIDING RECOMMENDATIONS IN A SOCIAL SHOPPING TRIP

(75) Inventor: Ranjith Jayaram, San Jose, CA (US)

(73) Assignee: Google Inc., Mountain View, CA (US)

( * ) Notice: Subject to any disclaimer, the term of this patent is extended or adjusted under 35 U.S.C. 154(b) by 821 days.

(21) Appl. No.: 13/439,795

(22) Filed: Apr. 4, 2012

(51) Int. Cl.
*G06Q 30/00* (2012.01)
*G06Q 30/06* (2012.01)
*G06Q 50/00* (2012.01)

(52) U.S. Cl.
CPC ........ *G06Q 30/0631* (2013.01); *G06Q 30/0605* (2013.01); *G06Q 50/01* (2013.01); *G06Q 30/0641* (2013.01)

(58) Field of Classification Search
CPC .......... G06Q 30/0605; G06Q 30/0631; G06Q 30/0641; G06Q 50/01
USPC ............................... 705/26.2, 26.7, 27.1, 319
See application file for complete search history.

(56) References Cited

U.S. PATENT DOCUMENTS

| | | | |
|---|---|---|---|
| 6,963,850 B1 * | 11/2005 | Bezos et al. ................. | 705/7.29 |
| 7,082,407 B1 * | 7/2006 | Bezos et al. ................. | 705/26.7 |
| 7,254,552 B2 * | 8/2007 | Bezos et al. ................. | 705/26.44 |
| 7,647,247 B2 | 1/2010 | Abraham et al. | |
| 8,244,599 B2 * | 8/2012 | Sundaresan .................. | 705/27.1 |
| 8,386,329 B1 * | 2/2013 | Baughman et al. .......... | 705/26.1 |
| 8,510,232 B2 * | 8/2013 | Datars et al. .................. | 705/347 |
| 8,671,029 B2 * | 3/2014 | Kassaei et al. ............... | 705/26.7 |
| 9,171,315 B1 * | 10/2015 | Jayaram ............. | G06Q 30/0222 |
| 2002/0184107 A1 * | 12/2002 | Tsuda et al. .................... | 705/26 |
| 2003/0009417 A1 | 1/2003 | Pappas | |
| 2005/0228757 A1 | 10/2005 | Sun et al. | |
| 2005/0261987 A1 * | 11/2005 | Bezos et al. .................... | 705/27 |
| 2008/0046298 A1 | 2/2008 | Ben-Yehuda et al. | |
| 2008/0208714 A1 * | 8/2008 | Sundaresan ..................... | 705/27 |
| 2008/0215349 A1 * | 9/2008 | Baran et al. ....................... | 705/1 |
| 2009/0177695 A1 | 7/2009 | Mahajan et al. | |
| 2009/0313055 A1 | 12/2009 | Martin et al. | |

(Continued)

FOREIGN PATENT DOCUMENTS

WO    WO-2011/119987 A2 *  9/2011

OTHER PUBLICATIONS

McCarthy, R., "The Power of Suggestion Social Shopping Sites Turn Online Shopping into a Group Activity," Inc. Magazine, vol. 29, No. 2, p. 48, Feb. 2007.*

(Continued)

*Primary Examiner* — Nicholas D Rosen
(74) *Attorney, Agent, or Firm* — McDermott Will & Emery LLP

(57) ABSTRACT

A system and machine-implemented method for providing one or more participants of a social shopping trip with recommendations, including analyzing context information regarding a social shopping trip, wherein the context information includes information regarding the types of items related to the social shopping trip as identified by one or more of the participants, analyzing one or more items posted to the social shopping trip by one or more participants of the social shopping trip, including analyzing the characteristics of the one or more items and feedback data relating to the one or more items provided by the one or more participants, determining one or more item characteristics corresponding to the social shopping trip based on results of analyzing the context information and the one or more items and providing a listing of one or more recommended items based on the one or more item characteristics.

26 Claims, 9 Drawing Sheets

(56) References Cited

U.S. PATENT DOCUMENTS

| | | |
|---|---|---|
| 2010/0030578 A1 | 2/2010 | Siddique et al. |
| 2010/0030594 A1 | 2/2010 | Swart |
| 2010/0185514 A1 | 7/2010 | Glazer et al. |
| 2010/0268661 A1 | 10/2010 | Levy et al. |
| 2011/0016023 A1 | 1/2011 | Zakas |
| 2011/0041083 A1 | 2/2011 | Gabai et al. |
| 2011/0093361 A1 | 4/2011 | Morales |
| 2011/0125569 A1* | 5/2011 | Yoshimura et al. ........ 705/14.36 |
| 2011/0173095 A1* | 7/2011 | Kassaei et al. ............ 705/26.41 |
| 2011/0282821 A1* | 11/2011 | Levy et al. .................... 706/47 |
| 2012/0123837 A1* | 5/2012 | Wiesner .................... 705/14.16 |
| 2013/0246186 A1* | 9/2013 | Chang et al. ............... 705/14.66 |
| 2013/0268302 A1* | 10/2013 | Jayaram .......................... 705/5 |

OTHER PUBLICATIONS

Anon., "Sun New Media Changes Name to NextMart to Reflect Enhanced Business Strategy," PR Newswire, Mar. 7, 2007.*

Schiller, K., "Augmented Reality Comes to Market," Information Today, vol. 26, No. 11, Dec. 2009.*

Anon., "TurnTo Unveils Next-Generation Social Commerce Suite for Online Retailers," PR Newswire, Jun. 8, 2010.*

\* cited by examiner

PROVIDING RECOMMENDATIONS IN A SOCIAL SHOPPING TRIP

BACKGROUND

The subject disclosure generally relates to online shopping applications, and, in particular, to providing recommendations to participants of a social shopping trip.

Shopping is a social experience usually involving families and friends as shopping companions. When shopping together, shopping companions exchange recommendations, give opinions, suggest alternatives, exchange notes, compare prices and help one another make better decisions. In contrast, with regard to online shopping most users do not have the capability of having a social experience. Online shopping provides users with a wider range of sources for shopping and provides users with the ability to shop without having to go to an actual store, but in most cases online shopping is done alone and does not afford the same benefits as a real world shopping experience.

Various recommendations may be presented to users engaging in online shopping. These recommendations may be provided based on various considerations such as the user's browsing history and the website the user is currently visiting. While the recommendations arc somewhat personalized based on whether the user is shopping at a specific site or has recently searched a set of specific items, these recommendations are an educated guess as to the actual items a user may be looking to purchase while browsing the web.

As online social networking and interactions with contacts become more popular. It may be desirable to provide recommendations to users based on the user's social shopping experience.

SUMMARY

The disclosed subject matter relates to a method executed by one or more computing devices for providing one or more participants of a social shopping trip with recommendations, the method comprising analyzing, using the one or more computing devices, context information regarding the social shopping trip, wherein the context information includes information regarding the types of items related to the social shopping trip as identified by one or more of the participants. The method further comprising analyzing, using the one or more computing devices, one or more items posted to the social shopping trip by one or more participants of the social shopping trip, including analyzing the characteristics of the one or more items and feedback data relating to the one or more items provided by the one or more participants. The method further comprising determining, using the one or more computing devices, one or more item characteristics associated with the social shopping trip based on results of analyzing the context information and the one or more items and providing a listing of one or more recommended items based on the one or more item characteristics.

The disclosed subject matter also relates to a system for providing one or more participants of a shopping trip with item recommendations based on a social shopping trip, the system comprising one or more processors and a machine-readable medium comprising instructions stored therein, which when executed by the processors, cause the processors to perform operations comprising analyzing context information regarding a social shopping trip, wherein the context information includes information regarding the types of items related to the social shopping trip as identified by one or more of the participants analyzing one or more items posted to the social shopping trip by one or more participants of the social shopping trip, the analyzing including analyzing the characteristics of the one or more items and feedback data relating to the one or more items provided by the one or more participants. The operations further comprising determining one or more item characteristics corresponding to the social shopping trip in based on results of analyzing the context information and the one or more items. The operations further comprising determining on or more recommendations based on the one or more item characteristics and providing the one or more recommendations for display to the one or more participants.

The disclosed subject matter also relates to a machine-readable medium comprising instructions stored therein, which when executed by a machine, cause the machine to perform operations comprising determining one or more item characteristics associated with a social shopping trip, the social shopping trip having a context defined by context information and being associated with one or more items posted to the social shopping trip by one or more participants of the social shopping trip, and feedback data associated with each of the one or more items provided by the one or more participants. The operations further comprising determining one or more user preferences associated with the one or more participants of the social shopping trip, the user preferences being determined based on shopping activities of the one or more participants with regard to one or more other social shopping trips. The operations further comprising determining one or more recommended items based on the determined items characteristics and determined user preferences and providing at least one of the one or more recommended items for display to at least one of the one or more participants of the social shopping trip.

It is understood that other configurations of the subject technology will become readily apparent to those skilled in the art from the following detailed description, wherein various configurations of the subject technology are shown and described by way of illustration. It will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
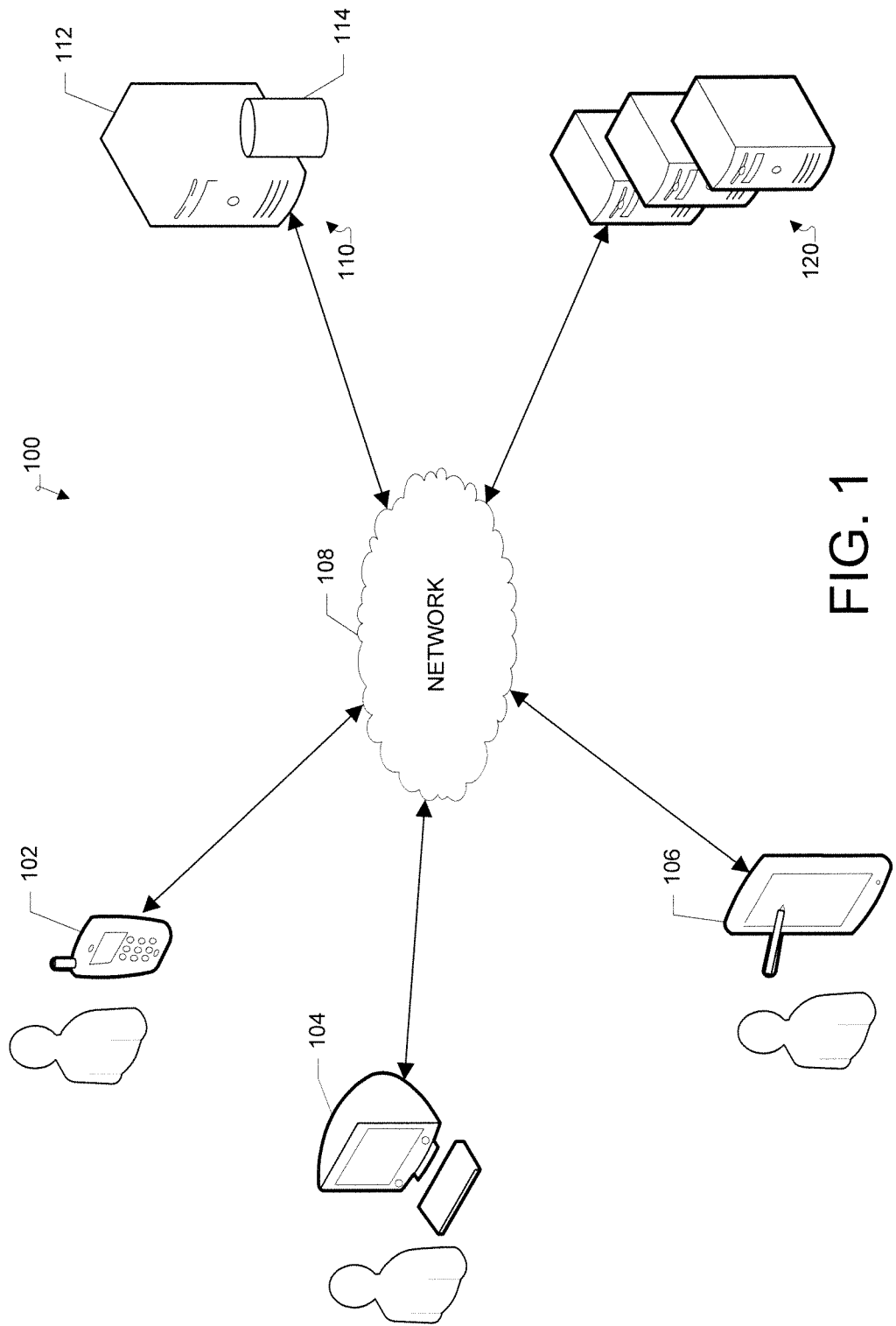
FIG. 1 illustrates an example client-server network environment which provides for facilitating social shopping trips.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a system and method for facilitating social shopping trips for one or more users connected over the internet (e.g., social networking contacts) and for providing recommendations to the participants of the social shopping trip. A user may engage in social shopping trips with one or more online contacts using a social shopping application. The social shopping application facilitates collaboration and feedback between shoppers without limiting the flexibility and variety provided by online shopping and provides for a shopping experience among users who are not necessarily physically located near one another. The social shopping application further supports the ability to extend a social shopping experience beyond online shopping and into shopping at physical stores. Information regarding the social shopping experience (e.g., items selected, purchased, feedback regarding the items, contacts participating in the shopping experience, historical information regarding previous or concurring social shopping trips) may be used to provide participants of the social shopping trip with recommendations during the social shopping experience.

A user may log into a social shopping application and initiate a social shopping trip. The user enters information regarding the context of the social shopping trip (e.g., the items and/or types of items that the user wishes to shop for). The context information may include information on the item or types of items that the user creating the social shopping trip and/or the participants of the social shopping trip wish to shop for and may include various item characteristics such as item type, category, brand, retailer, price range, color, and other similar item characteristics. The user invites one or more contacts or groups (e.g., social circles) to be invited to join the social shopping trip. Alternatively, the user may ask that the invitation to shop be shared with all contacts of the user (e.g., at one or more social networking sites). Still further, once the user enters the context information regarding the social shopping trip, the system may use such information to recommend one or more contacts for the specific social shopping trip (e.g., based on various information regarding the contacts such as past social shopping trip experiences and/or profile information indicating contact shopping interests or expertise).

The user may select one or more contacts for joining the social shopping trip. The selected contacts are notified about the ongoing social shopping trip and provided with the context of the social shopping trip. The invitees may then request to join the social shopping trip. Contacts may be added to the trip before or during the social shopping trip. In one example, only the creator of the social shopping trip may add participants to the shopping trip. In another example, all participants of the shopping trip may add others to the shopping trip. The creator may be notified of an invite sent by other participants and may have to approve the invite before the invitation is sent to the invitee and/or before the invitee can join the shopping trip.

The participants of the social shopping trip may individually browse various retailer websites (e.g., similar to a solitary online shopping experience), or physical stores, for items that the participants may be interested in purchasing and/or recommending to other participants. The retailer sites and physical stores are independent from the social shopping application, and are not required to vary any infrastructure to allow for social shopping trips according to the embodiments of the present subject matter.

The social shopping trip application may be implemented as a browser extension or a separate browser-based or software based application. Upon receiving an indication of a user being at an online retailer site, the social shopping application may determine an item being viewed by the user (e.g., using the URL) and post the item being viewed to the social shopping application. Similarly, a participant at a physical store may scan a barcode and/or enter information regarding the item (e.g., take a picture, write a description) and may select to share the item with other participants of the social shopping trip. Once the system detects an indication of interest of a participant in a certain item, the item is then posted to the social shopping application for review and comment by all other participants in the social shopping trip. In another example, online retailer sites may integrate social shopping trip capability into their website. For example, an online store may provide a button to launch the social shopping application and/or a button to post the item currently being viewed to the social shopping trip.

The system may also, with proper permissions, provide information as to the location of the participants (e.g., the online store or physical store that the user is currently at) and/or participants may explicitly share information about the online website or physical store they are currently shopping at, to prompt other participants to visit the same stores (e.g., online retailer site or physical store), thus making the shopping experience less solitary.

Participants can vote and comment on items posted by other participants. The social shopping trip display includes mechanisms for receiving feedback regarding the posted items from the participants of the social shopping experience. The participants can for example endorse an item posted by other participants, rate the item, vote "yes" or "no" on the item or recommend other items in lieu of the posted items to participants. In one example, the system may further provide mechanisms such that users can provide reasons for their feedback (e.g., endorsement, opinions and rating) regarding an item. For example, the system, upon receiving a certain endorsement, rating or other opinion regarding the item, may provide a list of reasons to the user and the user may select a reason for providing the feedback. The reasons provided for selection to the user may be customized to the feedback provided by the user. For example, a specific type of rating, vote or opinion, may trigger a listing of reasons specific to the feedback provided by the user. Additionally, the system may provide the user with a comment box where the user may provide feedback, an explanation about their feedback or comments regarding the item.

In addition to providing mechanism for feedback, the social shopping trip may further provide chat capability such that the participants of the social shopping trip may discuss various items or other information relating to the shopping trip using the chat capability. In one example, in addition the chat capability may be used for topics unrelated to the social shopping trip.

Items posted by each participant may be items intended for the participant or item recommendations for other participants within the social shopping trip (e.g., recommendations for the user initiating the social shopping trip). The system may receive the feedback from each of the one or more participants and update the social shopping trip to display the feedback associated with each item to the one or more participants. Thus, the participants are able to view the items posted to the social shopping trip and all feedback provided by the participants and associated with the posted items. Based on the comments, feedback or votes by various participants of the social shopping trip, a participant may select an item from the social shopping trip and add the item to a social shopping cart for purchase.

The subject disclosure further provides a social shopping cart for use in an online shopping environment (e.g., the social shopping application). Users participating in an online shopping environment may be associated with one or more social shopping carts. The social shopping cart may be a communal social shopping cart associated with a group of users (e.g., participants of a specific social shopping trip or a group of users such as a family) or a personal social shopping cart (e.g., specific to a particular user). A personal shopping cart may include items added by a user from all social shopping trips that the user is participating in and may further include other items the user wishes to add to the shopping cart independent of a shopping trip.

A communal social shopping cart associated with a shopping trip may include items placed into the social shopping cart by various participants of the social shopping trip. A communal social shopping cart may alternatively be associated with a group of users (e.g., a family, work group). The social shopping cart for the group may include items place by the users within the group from various social shopping trips that the group members are participating in and that the group members wish to purchase. Furthermore, the group's communal shopping cart may include other items the group members wish to add to the shopping cart independent of a social shopping trip. In one example, where users add items to a communal shopping cart, the item may be specific to one user associated with the shopping cart, or may be an item that more than one of the group members will purchase. For example, the group may be interested in purchasing a similar item for all members of the group, and may place the item (and a specific quantity) within the communal shopping cart.

The social shopping cart may also be used by the user when the user is shopping online outside the context of a social shopping trip. The social shopping cart provides the user with an augmented social shopping cart including all items from offline or online stores and having feedback and/or item information regarding the items which may be updated when the feedback and/or item information is added or modified at the source locations maintaining or displaying the item.

The social shopping cart may be shared and/or viewed by other users. For example, the participants of a social shopping trip may be able to view one another's social shopping cart, and may select items from a contact's social shopping cart and place the item within their own shopping cart or post the items to a social shopping trip they are currently participating in. In one example, each contact of the user having access to the shopping cart may have a different view of the shopping cart. For example, the items displayed to participants in a social shopping trip may be limited to those added from the same social shopping trip and the other items may not be displayed to the user. The user may adjust the access or viewing rights to his/her social shopping cart (e.g., communal or individual social shopping cart) such that different contacts have different access rights with respect to the social shopping cart of the user (e.g., different rights as to which items they may see, whether they can add items from the social shopping cart to their shopping cart, whether they can add to the social shopping cart or modify the social shopping cart).

The system may provide one or more recommendations to participants of a social shopping trip during the social shopping trip. The recommendations may include recommendations for one or more items relevant to the social shopping trip, one or more stores (e.g., physical stores or online retailer sites) that the participants may be interested in visiting, other active (e.g., ongoing) social shopping trips that the participants may be interested in viewing and/or joining, one or more social shopping carts that may include items of interest to the participants of the social shopping trip and/or one or more users (e.g., contacts of the one or more participants of the social shopping trip) that may be interested in joining the social shopping trip.

Recommendations may be presented to the user based on the activity of the participants of the social shopping trip. For example, the system may determine one or more item characteristics relevant to the social shopping trip and may provide recommendations for items having the specific item characteristics. The item characteristics are determined based upon one or more of context information provided by participants of the shopping trip (e.g., the user creating the shopping trip), items added to the shopping trip, feedback provided by the participants of the shopping trip, and items added and/or to a social shopping cart associated with the social shopping trip and/or one or more participants of the social shopping trip. The item characteristics may include price range, color, category, brand, store, store type, or other similar item characteristics determined to be preferred and/or desirable according to the activity of the participants of the social shopping trip.

The system may further take into account preferences of each of the participants of the social shopping trip when making recommendations. The social shopping application may maintain a user profile associated with each user. Each user may be a participant in one or more social shopping trips. The system may determine user preferences based on the user's activity in past or ongoing social shopping trips. Such preferences may include item characteristics such as brand, color, size, price range, category, store, store type, or other similar item characteristics preferred by the user based on their social shopping activity and purchase history. In addition, the system may determine one or more contact preferences for each user (e.g., contacts the user usually enjoys shopping with or relies on when making purchasing decisions). The preferences of participants of the social shopping trip may be used when making recommendations to the social shopping trip.

The system may also identify historical information regarding similar social shopping trips or users (e.g., based on the item characteristics associated with the social shopping trip and or participants) and may provide recommendations based on the historical information.

Based on the item characteristics identified (e.g., either with respect to the social shopping trip or participants of the social shopping trip) the system may identify one or more items, retailers, users, social shopping trips or social shopping carts and may make recommendations to the social shopping trip participants.

Additionally, the system may make price-based recommendations based on items and feedback data within the social shopping trip. In one example, the price-based recommendations may include identifying items within the social shopping trip and identifying the same or similar items offered for sale at a lower price. In one example, the system may identify the item and may perform a search for equivalent items (e.g., items having similar item characteristics) offered at a lower price, or other more favorable to the user (e.g., preferred brand, preferred store, preferred size) and may provide the item as a recommendation within the social shopping trip. Price-based recommendations may further include group offers. Since the social shopping trip includes a group of users desiring to shop for similar items (e.g., based on the context information), the system may search for one or more group offers based on the number of participants and may provide the group offers as a recommendation within the social shopping trip.

The recommendations may be displayed to the user within the user interface displaying the social shopping trip items and feedback. One or more of the recommendations may further be annotated with social information. For example, with respect to item or store recommendations, the system may provide feedback information available (e.g., form other social shopping trips). In one example, the system may provide an overall feedback or rating regarding an item based on the popularity of the item (e.g., how many others have liked, purchased or provided comments regarding the item), the relevance of the item (e.g., how closely it meets the preferences indicated within the social shopping trip), and other indications that the item is desirable to the participants of the social shopping trip.

The social shopping application unifies the shopping experience of all users shopping separately online or at physical stores and displays all items posted by any participant of the social shopping trip to all participants. Thus, the present system facilitates a social shopping experience while maintaining the flexibility of online shopping and further facilitating the combination of online and offline stores. The social shopping system maintains the associations between users, social shopping trips, items within the social trip, and information and feedback regarding each item. Thus, the social shopping application provides a social shopping trip that may be viewed across multiple browser sessions. That is, users of the social shopping application may log out and in of the application and view all social shopping applications in progress that they are participating in. The system provides for seamless participation in social shopping applications across multiple devices, since the social shopping application may be implemented as a web-based or soft-ware based and further may be implemented as a mobile application. The social shopping application may be used across various websites and physical stores without limitation, because the application does not require that the website or physical store infrastructure be changed to support the social shopping application.

The term "item," as used herein, encompasses its plain and ordinary meaning including, but not limited to, various products or services offered for sale at one or more online sites and/or physical stores. Each "item" may be identifiable by a name, model number, series number, and/or an item identifier (e.g., item identification number or barcode), and may be associated with "item information" such as name, price, availability, source (i.e., the site or physical store offering the item for sale), visual characteristics (e.g., size, color, shape), description (e.g., description of features), manufacturer, or other similar information.

The term "online retailer site" as used herein encompasses its plain and ordinary meaning including but not limited to a webpage, website, web application or other software-based application, tool or entity accessible to a user over the internet and offering one or more items available for sale. The term may encompass both retailers directly selling the item, or tools, websites or entities providing a link to one or more retailers providing the item for sale. The terms "online retailer site", "retailer site" or "online store" may be used interchangeably throughout the description of the subject matter and encompass same or similar meanings. The term "physical store" as used herein encompasses its plain and ordinary meaning, including, but not limited to, a brick and mortar store, or other offline entity or establishment accessible to the user offline (i.e., other than through the internet) and offering one or more items for sale. The terms "retailer" and "store" may be generally used throughout the specification and generally refers to "online retailer sites" or "physical stores" providing an item offered for sale.

Users of social networking services may create associations with one another. The phrase "social networking service" as used herein encompasses its plain and ordinary meaning, including, but not limited to, an online service, platform or site that focuses on building and reflecting of social associations and interactions among users. These associations may be stored within a social graph at each social networking service. Such user associations may be defined on a user-to-user basis, or as a group of users associated through membership within a group. As used herein, "contacts" refer to other users that a user is associated with, at one or more social networking services.

A user may create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. As used herein, a social circle can be described from the perspective of an individual that is the center of a particular collection of socially interconnected people, or from the aggregate perspective of a collection of socially interconnected people. In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

For example, a user of an electronic device may have different groups of friends, coworkers, and family, and there may be some overlap among those groups (e.g., a coworker who is also considered to be a friend, a family member who is also a coworker). Through the creation and use of social groups (e.g., social circles), the user can organize and categorize his/her contacts into various different groupings.

II. Example Client-Server Network Environment for Facilitating a Social Shopping Experience FIG. 1 illustrates an example client-server network environment which provides for facilitating social shopping trips. A network environment 100 includes a number of electronic devices 102, 104 and 106 communicably connected to a server 110 and/or remoter servers 120 by a network 108. Server 110 includes a processing device 112 and a data store 114. Processing device 112 executes computer instructions stored in data store 114, for example, for facilitating a social shopping application for use at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

A user interacting with a client device (e.g., electronic devices 102, 104 and 106) may access a social shopping client application and provide login information (e.g., using a user name and password). The client application may be a stand alone browser-based or other software-based application at the user's computer, or may be embedded as a feature within one or more software or browser-based applications running on the client device, within a browser (e.g., a social networking service or an online retailer site) or as a browser extension or may be implemented as a mobile application.

The login information may be received at a server hosting the social shopping system (e.g., server 110), and the user may be authenticated. The server hosting the social shopping application may maintain one or more shopping trips, and one or more user accounts for users of the social shopping application (e.g., participants participating in such shopping trips). The social shopping trip may be associated with including context information, list of participants, identity of trip creator, etc. The server (e.g., server 110), may further maintain an association between social trips and one or more items posted to each of the social trips. The items may further be associated with item information, retailer information and feedback data received from one or more participants of the social trip. Additionally, the social shopping trip may maintain one or more social shopping carts associated with each user of the social shopping application or group social shopping carts associated with a social shopping trips or groups of users. The information may be stored at one or more databases communicably coupled to the server (e.g., server 110).

The system may retrieve information regarding the user, including one or more social shopping trips that the user is participating in and may provide a data set including information regarding each social shopping trip (e.g., items, item information and/or feedback data) to the client device of the user. The client device may then generate a shopping application user interface displaying one or more shopping trips that the user is participating in. The social shopping application user interface may be displayed as a window at a side of the user interface displaying a third party retailer site the user is currently viewing, or may be embedded within one or more third party retail sites accessible through the browser. Additionally, the social shopping application may be implemented as a mobile application at the user's mobile device.

Once within the social shopping application, the user may create one or more social shopping trips and invite one or more contacts to participate in those social shopping trips. In one example, the user may create a shopping trip and enter information regarding the shopping trip (e.g., at the social shopping application user interface). The information entered by the user is received at the social shopping system (e.g., hosted at server 110) and used to create an instance of a social shopping trip associated with the user account of the user. The user may further select one or more contacts (e.g., contacts or social groups associated with the user at a social networking site) and may invite those contacts to join the social shopping trip. The system receives the list of contacts and may issue invitations to the one or more selected contacts, for example, including a link to the social shopping trip, and may send the invitation to the selected contacts (e.g., through email or messages sent to the social networking user accounts of the contacts). The contacts may select the link to join the shopping trip. Once an indication of a contact joining the shopping trip is received by the social shopping system, the system associates the contact with the social shopping trip and provides a data set including information (e.g., context information, items, item information, feedback) regarding the shopping trip for display to the contact (at the contact's client device).

The participants of the shopping application may browse online retail sites and physical (offline) stores and may add one or more items to a social shopping trip. The social shopping application may be implemented as a browser extension. The online location of the user (e.g., a third party retailer website), and the item being viewed by the user at the online location may be detected using the URL, and the user may be provided with an opportunity to post the item within the social shopping application. For example, upon receiving a request from the user to post the item to the social shopping trip (or automatically detecting user interest in an item while the user is logged into the social shopping application), the browser may detect the URL and notify the browser extension. The browser extension may then send the URL to an item search service (e.g., hosted at a remote server 120). The item search service may search across one or more databases for information regarding the item, and generate an item snippet. The snippet may include item information such as item name, photo, price, description, and other similar item information. The snippet is sent back to the browser extension, for displaying the item as part of the social shopping application user interface.

Alternatively, some third party retailers may have an embedded button at their website which may launch the social shopping application and/or allow the user to add items to the social shopping application by selecting the embedded button. Once an item is selected (e.g., using the embedded button), the system may retrieve item information regarding the item (e.g., from the specific online site that the user is shopping from). The system may generate a snippet and provide the snippet for display within the social shopping application.

Similarly, items from a physical store may be selected and shared with the participants of the social shopping trip at the social shopping application. For example, a user at a physical store may take a picture of an item, enter information regarding an item or scan a barcode of the item and request that the item be posted to the social shopping application. The system may retrieve item information regarding the item (e.g., through the item search service using the barcode). Additionally, the system, may then detect the location of the participant (e.g., through GPS or by querying the user) to detect retailer information. The item along with the information regarding the item may be posted to the social shopping application. The items detected or posted to the social shopping trip may be limited to items relating to the context indicated by the user initiating the social shopping trip.

The system may further provide recommendations to the participants of the social shopping trip according to the activity of the participants within the social shopping trip and/or one or more other social shopping trips. The recommendations may include one or more items, one or more stores (e.g., online retailer sites and/or physical stores), one or more potential social shopping trip participants and/or other social shopping trips or shopping carts which may include items or feedback of interest to participants of the social shopping trip. The system may generate the recommendations and provide a data set including one or more recommendations to the client device of the user to be displayed with the social shopping trip at the social shopping applications user interface. The recommendations may be displayed in a similar manner as items posted by participants of the social shopping trip. The recommendations may be generated automatically by the system or may be generated in response to a request from the participants of the social shopping trip.

According to some aspects, remote servers 120 can be any system or device having a processor, a memory and communications capability for hosting various online retailer sites, remote social networking services, and/or an item search service. In one embodiment, remote servers 120 may be further capable of maintaining social graphs of users and their contacts. The remote social networking services hosted on the remote servers 120 may enable users to create a profile and associate themselves with other users at a remote social networking site. The remote servers 120 may further facilitate the generation and maintenance of a social graph including the user created associations. The social graphs may include, for example, a list of all users of the remote social networking site and their associations with other users of a remote social networking site. Remote servers 120 may further host an item search service coupled to one or more databases (hosted by remote servers 120) maintaining information regarding items available online at one or more online retailer sites or at a physical store.

In some example aspects, server 110 and/or one or more remote servers 120 can be a single computing device such as a computer server. In other embodiments, server 110 and/or one or more remote servers 120 can represent more than one computing device working together to perform the actions of a server computer (e.g., cloud computing). In some embodiments, server 110 and/or one or more remote servers 120 may be coupled with various remote databases or storage services. Communications between the client devices 102-106, server 110 and/or one or more remote servers 120 may be facilitated through the HTTP communication protocol. Other communication protocols may also be facilitated including for example, XMPP communication, for some or all communications between the client devices 102-106, server 110 and one or more remote servers 120.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

III. Processes for Facilitating a Social Shopping Experience

Figure 2:
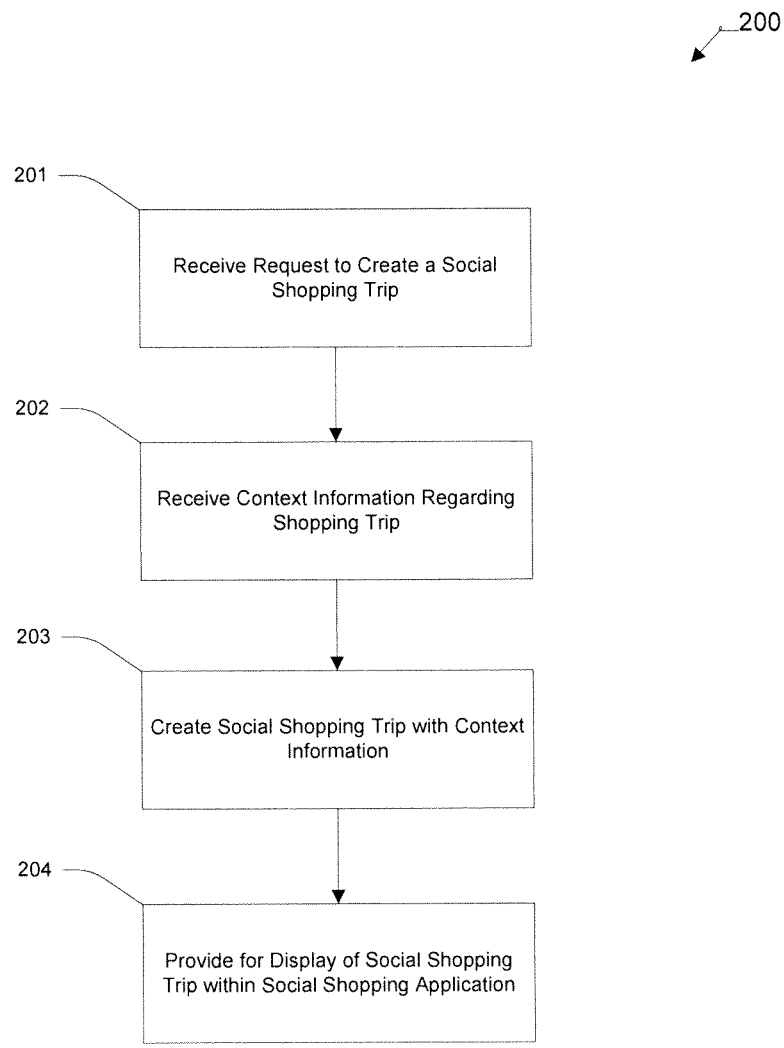
FIG. 2 illustrates a flow chart of an example process for creating a social shopping trip.

FIG. 2 illustrates a flow chart of an example process 200 for creating a social shopping trip. In block 201, the system receives a request to create a social shopping trip. A user may log into a social shopping application and initiate a social shopping trip. Once the user requests to add the social shopping trip, the user may input information regarding the context of the social shopping trip. The context information may include a set of keywords associated with the social shopping trip (e.g., the items and/or types of items that the user wishes to shop for and/or other shopping trip objectives). In one example, the user may input the set of keywords and/or may input free-form natural language text describing what he/she wishes to do during the trip. The system may receive the free-form input and extract relevant intelligence and/or information (e.g., one or more keywords such as item, item types and/or other trip objectives). The extracted information may be associated with the social shopping trip as context information. In one example, each social shopping trip is limited to items relating to the context specified by the user. The user may create a shopping trip and enter information regarding the shopping trip at the social shopping application user interface.

In block 202, the system receives the context information regarding the social shopping trip. In one example, the context information may include a set of keywords associated with the social shopping trip (e.g., the items and/or types of items that the user wishes to shop for and/or other shopping trip objectives). Additionally, the system may recommend additional keywords to the user for selection and inclusion as part of the context information. In one example, the user or other participants of the social shopping trip (with proper permission or approval from the user) may modify the context information (e.g., to add or remove one or more keywords associated with the social shopping trip).

In block 203, the system creates a social shopping trip and associates the received context information with the social shopping trip. The information entered by the user and received in block 202 may be received at the social shopping system (e.g., hosted at server 110) and used to create an instance of a social shopping trip associated with the user account of the user. Furthermore, the user is added as the first participant of the shopping trip. The system may further receive a request to invite one or more contacts or groups (e.g., social groups) to the social shopping trip. Alternatively, the user may ask that the invitation to shop be shared with all contacts of the user (e.g., at one or more social networking sites). Still further, once the user enters the context information regarding the social shopping trip, the system may use such information to recommend one or more contacts for the specific social shopping trip (e.g., based on various information regarding the contacts such as past social shopping trip experiences and/or profile information indicating contact shopping interests or expertise). An example process for adding participants to the social shopping trip is described in further detail below with respect to FIG. 3.

In block 204, the social shopping trip is provided for display within a user interface displaying the social shopping application associated with the user's user account. In one example, the user may be associated with more than one shopping trip and the shopping trips may be displayed as tabs, lists or otherwise displayed to the user within the social shopping application user interface. An example graphical user interface displaying a social shopping trip is discussed in further detail below with respect to FIG. 7.

Figure 3:
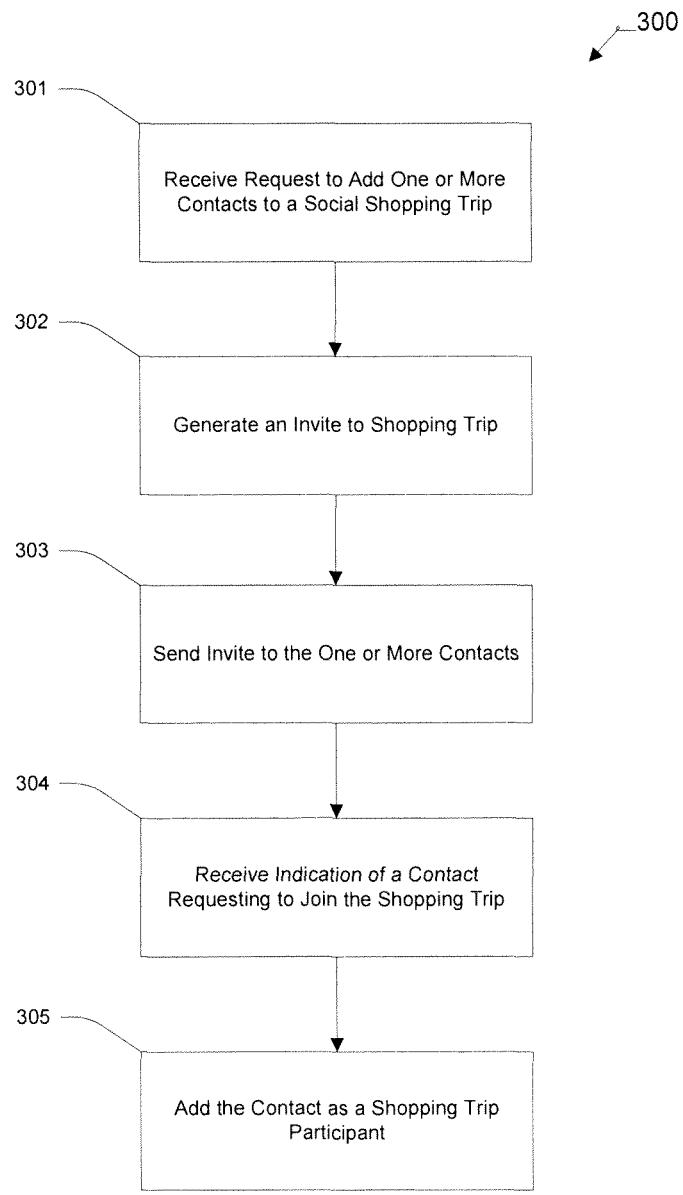
FIG. 3 illustrates a flow chart of an example process for adding participants to a social shopping trip.

FIG. 3 illustrates a flow chart of an example process 300 for adding participants to a social shopping trip. In block 301, the system may receive a request to invite one or more contacts to a social shopping trip. The contacts may include contacts or social groups associated with the user at a social networking service or contacts the user is otherwise associated with (e.g., over e-mail communication, or through real world contacts). The user may enter contact information for each user and/or may provide contact information for each contact.

The system may also recommend one or more contacts to the user and the user may select the recommended contacts and request that those contacts be invited to join the social shopping trip. The system may for example determine one or more item characteristics associated with the social shopping trip (e.g., according to items and feedback within the social shopping trip), preferences of the participants of the social shopping trip and information regarding one or more similar social shopping trips and may recommend contacts to the user based on the determined item characteristics and/or user preferences. For example, the system may recommend contacts based on their preferences and expertise regarding items associated with the social shopping trip. Additionally, the system may determine contacts that the user prefers to shop with (e.g., based on previous social shopping trips) or those that the user relies on when making purchasing decisions and may recommend those contacts to the user for inviting to the social shopping trip. Furthermore, based on participants within similar social shopping trips, the system may suggest one or more of those participants as potential participants for the social shopping trip. An example process for providing recommendations to participants of a social shopping trip is described in further detail below with respect to FIG. 5.

In block 302, the system generates an invite to the shopping trip. The invite may include a link to the social shopping trip, and may further include information regarding the shopping trip (e.g., the context of the shopping trip), to allow the contacts to decide whether they would like to join the shopping trip. Additionally, the invite may include a comment or message by the user and/or an automatically generated invite message.

In block 303, the system sends the invite to the one or more contacts (e.g., as an email message and/or messages or post sent to the social networking user accounts of the contacts). In one example, the system may issue a request to the social networking service hosting the user account for the contacts or the social group and may request that the social shopping network post the invite within the user account of each contact (e.g., using an API call). In one example, the post may be posted to the user account of the user at the social networking service and viewable by all contacts associated with the user at a social networking service. The contacts may select the link to join the shopping trip.

In block 304, the system may receive an indication of a contact requesting to join the shopping trip. For example, the contact may select the link or otherwise request to join the shopping trip. Once an indication of a contact joining the shopping trip is received by the social shopping system, in block 305, the system adds the contact as a participant to the social shopping trip. For example, the system may associate the contact with the social shopping trip and provide a data set including information regarding the shopping trip for display to the contact at the contact's client device. Once the social shopping trip participants (e.g., the user initiating the social shopping trip or contacts joining the social shopping trip) have joined the social shopping trip, the participants may individually browse various online retailer websites (e.g., similar to a solitary online shopping experience), or physical stores, for items that the participants may be interested in purchasing and/or recommending to other participants and the items may be added to the social shopping trip. An example process for adding an item to a social shopping trip is described in further detail below with respect to FIG. 4.

Figure 4:
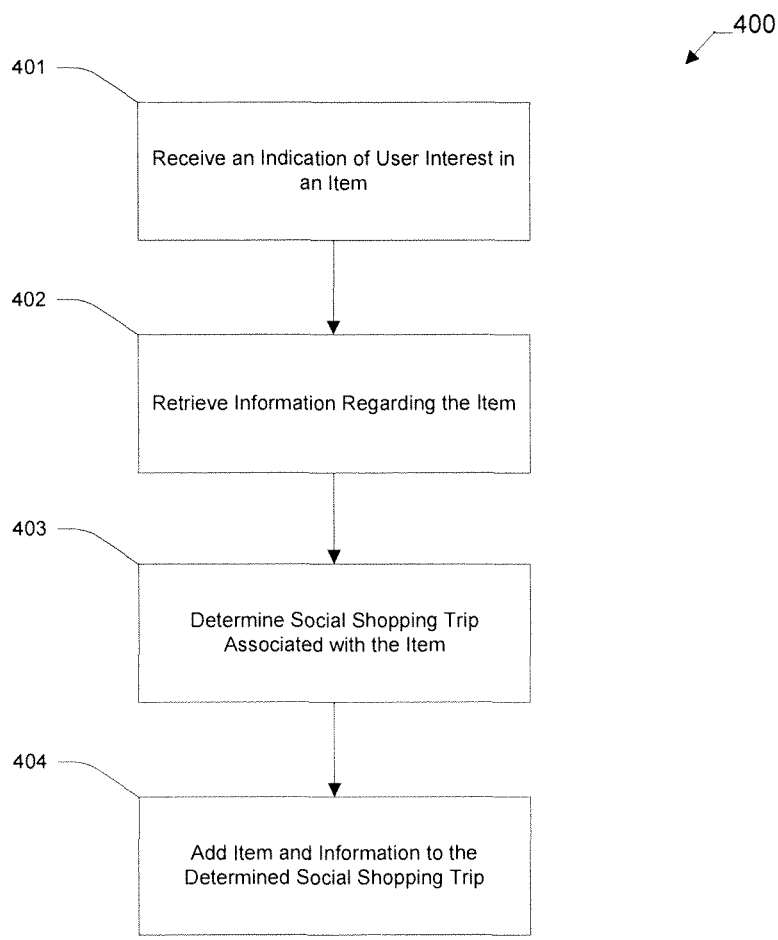
FIG. 4 illustrates a flow chart of an example process for adding an item to a social shopping trip.

FIG. 4 illustrates a flow chart of an example process 400 for adding an item to a social shopping trip. In block 401, the system receives an indication of user interest in an item. The participants of the social shopping trip may browse online retail sites and physical (offline) stores and may add one or more items to a social shopping trip. For example, when browsing one or more online retailer stores, the user may click a button to add the item currently being viewed to the social shopping trip. Similarly, a participant at a physical store may scan a barcode and/or enter information regarding the item (e.g., take a picture, write a description) using a mobile social shopping application and may select to share the item with other participants of the social shopping trip. The system may also automatically detect user interest in an item (e.g., when the user views an item for a specific period of time) while the user is logged into the social shopping application.

In one example, the social shopping trip application may receive an indication of the location of the user (e.g., online or at a physical store) and may provide the user with the appropriate user interface for adding the item. For example, where the detected location of the user is a physical store, the user may be provided with prompts to scan a barcode or manually enter information regarding an item. On the other hand, if the user is online, the system may provide a button to the user for importing the item into the social shopping application.

In block 402, the system retrieves information regarding the item. The social shopping application may be implemented as a browser extension. For example, the online location of the user (e.g., a third party retailer website), and the item being viewed by the user at the online location may be detected using the URL. Upon detecting an indication of interest in the item, the browser may detect the URL and notify the browser extension. The browser extension may then send the URL to an item search service (e.g., hosted at a remote server 120). The item search service may search across one or more databases for information regarding the item, and generate an item snippet. The snippet may include item information such as item name, photo, price, description, and other similar item information. The snippet may be sent back to the browser extension, for displaying the item as part of the social shopping application user interface.

Alternatively, some third party retailers may have an embedded button at their website which launches the social shopping application and/or allows the user to add items to the social shopping application by selecting the embedded button. Once an item is detected, the third party retailer site may retrieve item information regarding the item (e.g., from the specific online site that the user is shopping from), and generate a snippet and provide the snippet to the system for display within the social shopping application. The snippet may include item information such as item name, photo, price, description, and other similar item information.

Similarly, items from a physical store may be selected and shared with the participants of the social shopping trip at the social shopping application. For example, a user at a physical store may take a picture of an item, input manual information regarding the item and/or scan a barcode (or other item identifier) of the item and request to post the item to social shopping trip. The system may retrieve item information regarding the item (e.g., through the item search service using the barcode). For example, upon detecting the item identifier (e.g., barcode), the system may send the identifier to an item search service (e.g., hosted at a remote server 120). The item search service may search across one or more databases for information regarding the item, and generate an item snippet. The snippet may include item information such as item name, photo, price, description, and other similar item information.

Furthermore, the user may manually enter information regarding the item (e.g., a picture, price information, description). The user may also enter a comment or explanation regarding the item (e.g., asking for feedback, recommending the item to another participant of the shopping trip, providing a specific fact about the item). Such information is received by the system and included within the item information associated with the item. Additionally, the system may detect the location of the participant indicating retailer information (e.g., based on the URL, through GPS, through the website or according to user input) and provide the retailer information and include the retailer information with the item information.

In block 403, the system may determine the social shopping trip associated with the item. As described above, each user may participate in several social shopping trips. Thus, when the system receives an indication of user's interest in an item, the system may identify the social shopping trip that the item should be posted to. The items detected or posted to the social shopping trip may be limited to items relating to the context indicated by the user initiating the social shopping trip. For example, the identification may be made according to the context information associated with each social shopping trip. The context information may provide information regarding the objectives of one or participants of the social shopping trip including one or more keywords associated with the social shopping trip (e.g., the items and/or types of items that the user wishes to shop for and/or other shopping trip objectives). The system may determine the appropriate social shopping trip based on such information. Additionally, the system may prompt the user for the appropriate social shopping trip and the user may indicate the appropriate social shopping trip for the item. In block 404, the item along with the information retrieved in block 402, may be posted to the identified social shopping trip within the user's social shopping application. In one example, the system provides various mechanisms within the display area displaying the shopping trip for receiving feedback regarding the item from one or more participants of the social shopping trip. The mechanism may include an endorsement button, a mechanism for indicating a rating of the item, a comment box or other similar means for inputting user opinions regarding the item.

The items posted within the social shopping trip by each participant can be viewed by other participants of the social shopping trip and those participants may provide comments and feedback regarding the item using the provided feedback mechanisms. Participants can vote and comment on items posted by other participants. The social shopping trip user interface may provide mechanisms (e.g., an endorsement button, a rating box, a comment box) for receiving feedback regarding the posted items from the participants of the social shopping experience. The participants can for example endorse an item posted by other participants, rate the items, vote "yes" or "no" on the item or recommend other items in lieu of the posted items to participants. Items posted by each participant may be items intended for the participant or item recommendations for other participants within the social shopping trip (e.g., recommendations for the user initiating the social shopping trip). The system may receive the feedback from each of the one or more participants and updated the social shopping trip to display the feedback associated with each items to the one or more participants. Thus, the participants are able to view the items posted to the social shopping trip and all feedback provided by the participants and associated with the posted items.

Based on the comments, feedback or votes by various participants of the social shopping trip a participant may select an item from the social shopping trip and add the item to a social shopping cart for purchase. An example graphical user interface displaying a social shopping cart is discussed in further detail below with respect to FIG. 8. In one example, the user interface may include an "add to cart" mechanism and once the participants have decided that they would like to purchase the item, the item may be added to the cart for the participant. Furthermore, the social shopping trip may include a group cart, where the participants may add items intended for the entire group. The items within the social shopping cart may then be selected and purchased.

The social shopping trip may be shared with other users not necessarily participating in the shopping trip. In one example, a summary of the shopping trip may be generated and made available for viewing by other users. The summary may include a listing of items that were viewed during the social shopping trip and may further include information regarding how those items were rated by the participants of the social shopping trip. The summary may also include further details regarding the social shopping trip such as comments, or other feedback made regarding the items by the participants of the social shopping trip.

During the social shopping trip, in addition to items posted by the participants of the social shopping trip, the system may further post recommended items or stores to the social shopping cart. An example process for providing recommendations to the participants of the social shopping trip is described in further detail below with respect to FIG. 5.

Figure 5:
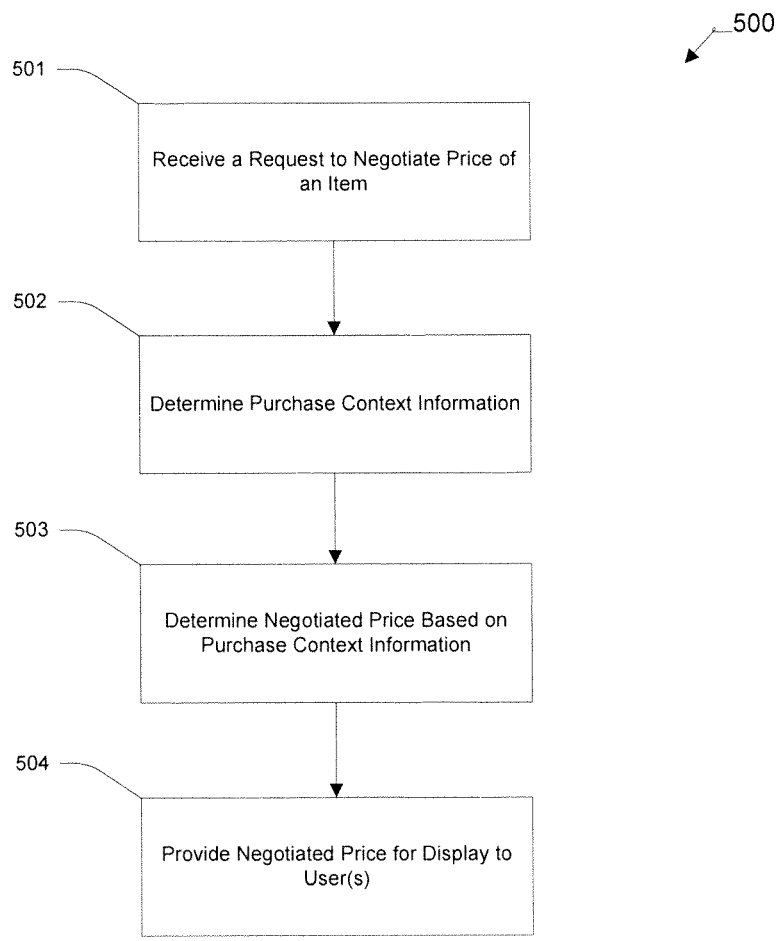
FIG. 5 illustrates a flow chart of an example process for providing recommendations to participants of a social shopping trip.

FIG. 5 illustrates a flow chart of an example process 500 for providing recommendations to participants of a social shopping trip. In block 501, the system determines one or more preferred item characteristics associated with the social shopping trip. The item characteristics may be determined based on context information associated with the social shopping trip, items posted to the social shopping trip, feedback regarding the items, and/or activities with respect to the social shopping trip (i.e., selecting the item to place within a social shopping cart, purchasing the item, recommending the item). The item characteristics may include item type, item category, price range, color, size, availability, store, store type (e.g., online or offline, direct retailer, wholesale, etc.), and other similar item characteristics that are determined to be preferred by participants of the social shopping trip. An example process for determining item characteristics associated with a social shopping trip (e.g., the present social shopping trip and/or one or more similar social shopping trips) is described in further detail below with respect to FIG. 6.

In block 502, the system determines one or more user preferences for the participants of the social shopping trip. In one example, the user preferences may be based on other past or ongoing social shopping trips that a user (e.g., a participant of the social shopping trip) has participated in (e.g., items posted by the user within one or more social shopping trips, feedback provided by the user within the one or more social shopping trips), items within one or more social shopping carts associated with the user, the user's purchase history, as well as information provided by the user such as preferred contacts or preferred item characteristics. The system may determine one or more user preferences including item characteristics preferred by the user. The item characteristics may include item type, item category, price range, color, size, availability, store, store type (e.g., online or offline, direct retailer, wholesale, etc.), and other similar item characteristics that are determined to be preferred by participants of the social shopping trip. The user preferences may be based upon historical information as well as social shopping trips that the user is concurrently participating in. In one example, the user preferences may be stored within a user profile of the user.

In block 503, the system determines item characteristics associated with one or more social shopping trips similar to the social shopping trip. The similar social shopping trips may be determined based on various criteria, including having similar context, having similar set of participants, and having a similar set of items or item characteristics. The system may determine one or more item characteristics associated with the one or more similar social shopping trips. An example process for determining item characteristics associated with a social shopping trip (e.g., the present social shopping trip and/or one or more similar social shopping trips) is described in further detail below with respect to FIG. 6.

In block 504, the system may further determine user preferences relating to one or more similar users as the participants of the social shopping trip. User may be identified as being similar to the participants of the social shopping trip, if those users have similar characteristics or preferences as the users participating in the social shopping trip. For example, user characteristics (e.g., demographic information such as age, gender, geographic location, income), as well as preferences such as item preferences of the participants of the social shopping trip may be compared against other users of the social shopping application to identify other similar users and the user preferences of those users may be determined.

In block 505, the system provides one or more recommendations for display to the participants of the social shopping trip. The recommendations may be based upon one or more of the item characteristics associated with the social shopping trip, item characteristics associated with one or more similar social shopping trips, user preferences of the participants of the social shopping trip, and/or user preferences of one or more similar users as the participants of the social shopping trip. Each set of characteristics may be given a weight or importance. For example, where the recommendation is being presented to all social shopping trip participants, user preferences of individual users may be given less weight than the other criteria for generating recommendations. Furthermore, as described above, each individual item characteristic may be assigned a different weight according to the extent to which each item characteristic or preference is shared among the social shopping trips, one or more participants and/or one or more of the similar users or social shopping trips. The recommendations may include one or more items that the participants of the social shopping trip are likely to be interested in purchasing. In addition, the system may recommend one or more stores (e.g., online retailer sites and/or offline physical stores) that the user may be interested in recommendations.

For example, based on item characteristics and preferences identified in one or more of blocks 501, 502, 503 and 504 the system may search for items that may be of interest to the participants of the social shopping trip and may present the items to the participants of the social shopping trip. In one example, the items may be posted to the social shopping trip and may be displayed in a similar manner as items posted by participants of the social shopping trip. In one example, the items recommended may be annotated with feedback information such as the number of other users or social shopping trips endorsing the item, number of users who purchased the item, and other similar information. In one example, the recommendations may be limited by the context of the social shopping trip, such that only items related to the context of the social shopping trip are presented as recommendations to the user.

The system may also recommend one or more stores that the participants of the shopping trip may be interested in visiting. The stores may be identified based upon items offered for sale at the stores and store preferences associated with the social shopping trip and/or participants of the social shopping trip. As described above, the item characteristics associated with the social shopping trip and user preferences both may include information regarding preferred stores or store types and the system may find one or more stores meeting those preferences.

According to the item characteristics and preferences determined in blocks 501-504, the system may also identify one or more social shopping trips or social shopping carts that participants of the social shopping trips may be interested in joining or viewing. For example, the system may find social shopping trips or social shopping cart including items meeting the item characteristics and preferences of the social shopping trip, participants of the social shopping trip, and/or one or more similar social shopping trips or users.

As described above, based on the determined preferred item characteristics of the social shopping trip and/or participants of the social shopping trip, as well as one or more similar social shopping trips and/or users, the system may further recommend one or more other users that may be interested in joining the social shopping trip. For example, based on the determined item characteristics and preferences determined in one or more of blocks 501-504, the system may find users having user preferences or expertise that match those of the social shopping trips or participants of the social shopping trip and may recommend those users to the participants of the social shopping trip. The participants of the social shopping trip may then select to invite those users to join the social shopping trip. In one example, the recommended users may be a contact (i.e., pre-associated with) one or more participants of the social shopping trip.

In addition to recommendations based on item characteristics, the system may further recommend one or more items and/or stores to the user based on price-based considerations. The system may make price-based recommendations based on items and/or feedback data within the social shopping trip. In one example, the price-based recommendations may include identifying items within the social shopping trip and identifying same or similar items offered for sale at a lower price. In one example, the system may identify the item and may perform a search for equivalent items (e.g., items having similar item characteristics) offered at a lower price, or other more favorable to the user (e.g., preferred brand, preferred store, preferred size) and may provide the item as a recommendation within the social shopping trip. Price-based recommendations may further include group offers. Since the social shopping trip includes a group of users desiring to shop for similar items (e.g., based on the context information), the system may search for one or more group offers based on the number of participants for one or more items posted to the social shopping trips or recommended items determined by the system and may provide the group offers as a recommendation within the social shopping trip. The group offers may be based upon the number of participants within the social shopping trip and/or a number of participants which the system determines as likely to want to purchase the item associated with the group offer.

Figure 6:
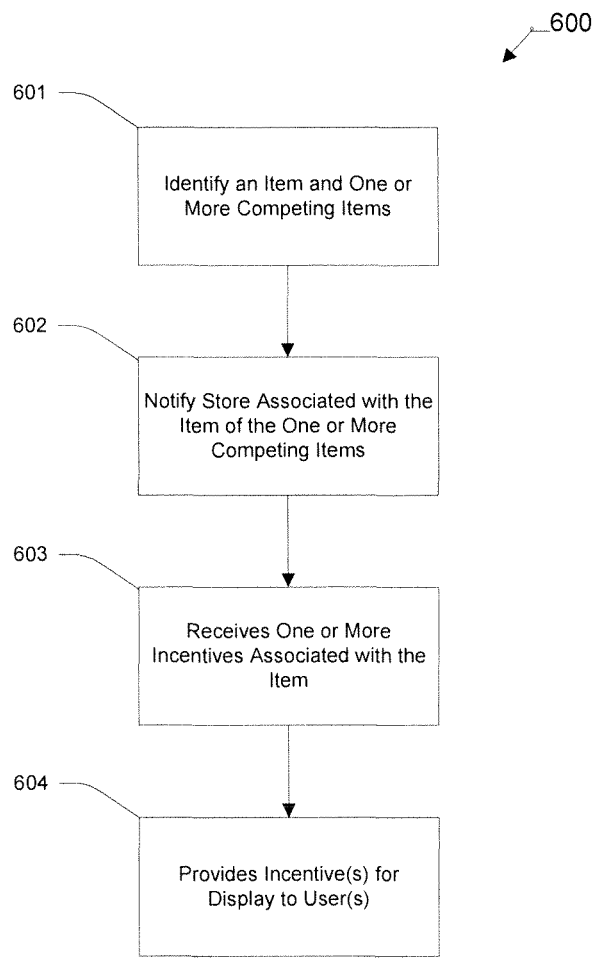
FIG. 6 illustrates a flow chart of an example process for determining one or more item characteristics associated with a social shopping trip.

FIG. 6 illustrates a flow chart of an example process 600 for determining one or more preferred item characteristics associated with a social shopping trip. In step 601 the system analyzes context information associated with the social shopping trip. When a social shopping trip is created, the user initiating the social shopping trip may provide a description of the context of the social shopping trip (i.e., types of items the user is shopping for). This information dictates the types of items that will be posted to the specific social shopping trip and defines a narrow range of items which the participants of the social shopping trips are interested in. In step 602, the system analyzes the items posted to the social shopping trip as well as items added to the shopping cart to generate a list of item characteristics (item type, color, size range, price range, preferred store, preferred store type (e.g., online vs. offline stores), common among the items posted to the social shopping trip.

In step 603, the system analyzes feedback provided by one or more participants of the social shopping trip. Feedback provided by the participants of the social shopping trip may be analyzed to determine preferred item characteristics such as price range, color, size, preferred store, preferred store type and other similar item characteristics. For example, the system may identify those items having the highest ratings and may determine item characteristics associated with higher rankings, positive endorsements, and otherwise positive feedback regarding an item. As described above, users may further provide explanation regarding their reasons for ranking items and such comments and reasoning may be used to determine item characteristics that are important or preferred by participants of the social shopping trip. Feedback data may also be used to rank or assign priority to the determined item characteristics.

In step 604, the system determines one or more item characteristics associated with a social shopping trip based on analyzing one or more of context information, items posted to the social shopping trip and/or feedback provided by participants of the social shopping trip. In addition to item characteristics, the system may also determine weights or priority for one or more item characteristics based on the analyzing. The determined item characteristics may be used by the system to provide the participants of a social shopping trip with one or more recommendations.

IV. Example Graphical User Interfaces of a Social Shopping Application

Figure 7:
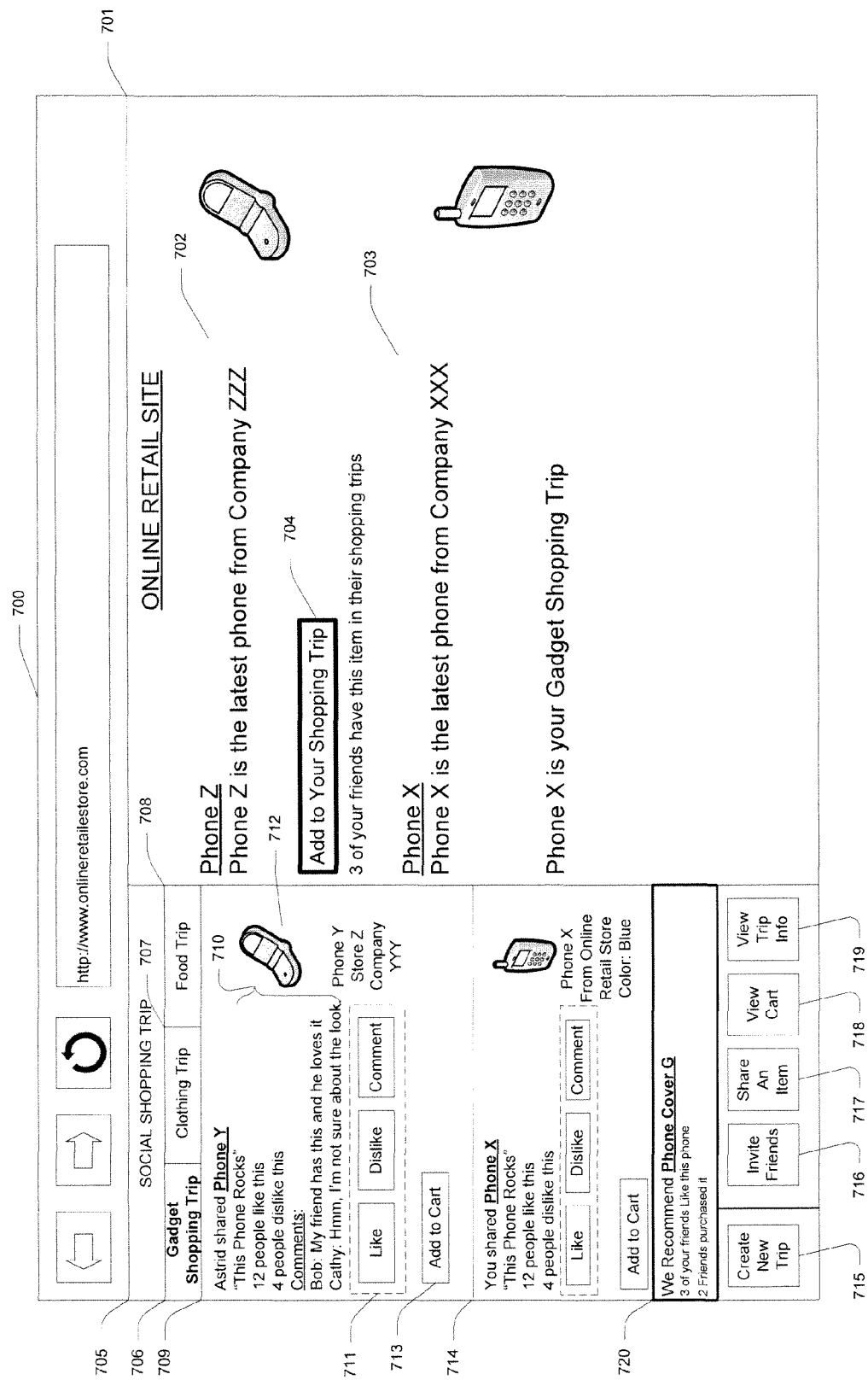
FIG. 7 illustrates an example screen shot of a graphical user interface displaying a web browser including a social shopping application.

FIG. 7 illustrates an example screen shot of a graphical user interface displaying a web browser 700 including a social shopping application. In the illustrated example, the social shopping trip application is illustrated as a browser extension displayed on the browser window along with an online retail site being visited by a user. The web browser 700 includes a task bar area including an address bar and one or more navigation buttons. The browser window further includes a web site display area 701 and a shopping trip application display area 705. An online retail site being visited by a user is illustrated within the website display area 701. The online retailer site includes images of one or more items. In the example online retail site two items 702 and 703 available for sale are illustrated. Item 702 is a "phone Z" and includes an item name, description and photo. An embedded "add to your shopping trip" button 704 is included within the online retailer site for facilitating the adding of the item from the site to the social shopping trip of the user. The online retailer site further displays social information regarding the item (e.g., whether contacts of the user have added the item to their social shopping trips). A second item 703, "phone X" is also displayed along with item information and a photo. "Phone X" is illustrated as being added to the social shopping trip of the user.

The social shopping application area 705 displays three separate social shopping trips within tabs 706, 707 and 708. Tab 706 includes items added to a social shopping trip labeled "Gadget shopping trip", tab 707 includes items added to a social shopping trip labeled "clothing trip" and tab 708 includes items added to a social shopping trip labeled "food trip". Tab 706 corresponding to the gadget shopping rip is displayed as being selected by the user and displays two items 709 and 714 having been added to the social shopping trip. Each item is displayed within a distinct item area. Information displayed for each item is generally described with respect to item 709.

The information regarding the phone as well as a photo of the item is displayed within an item information area 712. The tab 706 further displays comments regarding the item and social endorsement data regarding which people like the item 709 in a social information area 711. In addition feedback mechanisms 710 are included within the display area for facilitating the input of a comment regarding item 709, as well as endorsing or disliking the item. An "add to cart" button 713 is further displayed in association with the item 709 for allowing the user to add the item to a social shopping cart. Similar information is provided for a second item 714, the information including comments and social endorsement information, information and photo regarding the item, social input mechanisms and an add to cart button.

At the button of the social shopping application area 705 various input mechanisms are provided to allow the user to interact with the social shopping application. A "create new trip" button 715 facilitates the creation of a new social shopping trip. An "invite friends" button 716 allows the user to add more friends to one or more of his/her social shopping trips, the "share an item" button 717 allows the user to share one of his/items with one or more contacts in one or more social shopping trips. The "view cart" button 718 facilitates the navigation to the user's one or more social shopping carts, and a "view trip info" button 719 allows the user to view information regarding one or more of his/her social shopping trips. A recommendation area 720 is further displayed within the social shopping application display area 705 displaying one or more item recommendations. Item recommendations may additionally include social information showing whether the item was endorsed and/or purchased by other users (e.g., contacts of the user associated with the social shopping application).

Figure 8:
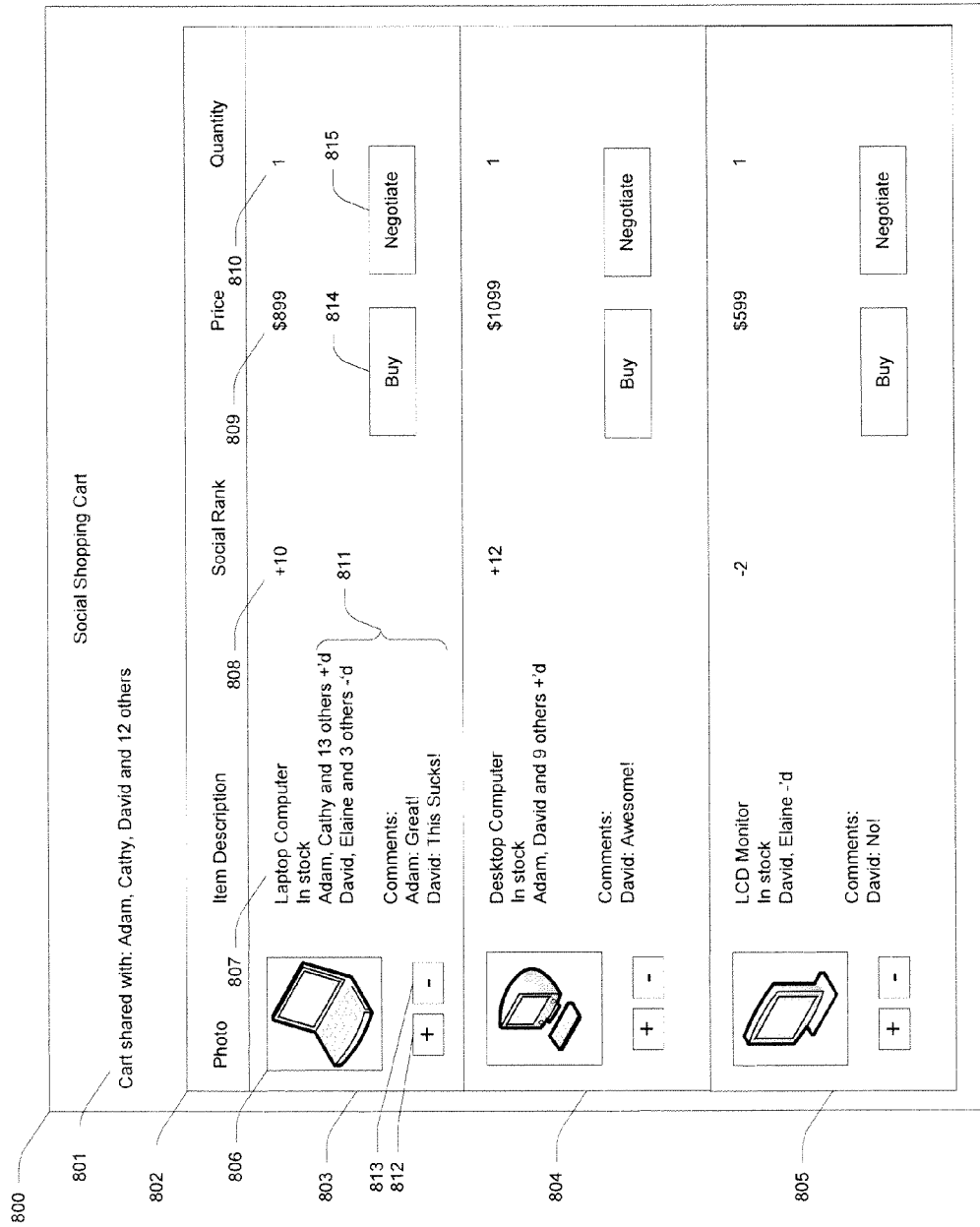
FIG. 8 illustrates a screen shot of a graphical user interface displaying an example social shopping cart.

FIG. 8 illustrates a screen shot of a graphical user interface displaying an example social shopping cart 800. The social shopping cart 800 includes a general display area 801, and an item display area 802. The general display area 801 provides general social information regarding the social shopping cart, including for example, whether the social shopping cart is being shared and/or viewed by contacts of the user. The item display area displays items 803, 804 and 805. Information displayed for each item is generally described with respect to item 803. Item 803 is displayed within the cart including a photo 806, an item description 807, a social rank 808, a price 809, a quantity 810, social information area 811, endorsement mechanisms 812 and 813 and purchase mechanisms 814 and 815. The social rank 808 may provide information regarding the popularity of the item among contacts of the user (e.g., participants within the social shopping trip that the item is posted). For example, item 803 is indicated as having a social ranking of +10, indicating that of the people who provided feedback, 10 more people endorsed rather than provide negative feedback regarding the item.

Further detail regarding the feedback of contacts regarding the item is provided in the social information area 811. The social information area 811 provides information regarding how many contacts provided positive endorsements rather than negative input regarding the item, and may further provide the identity of those users. Additionally, the social information area displays comments regarding the item provided by contacts. The feedback displayed as the social information area 811 may comprise feedback provided by participants of the a social shopping trip where the item is posted and is displayed within the cart and updated as the feedback information is provided at the social shopping trip. The endorsement mechanisms 812 and 813 allow the user to provide feedback regarding the item. A "buy" button 814 is provided and allows the user to request to purchase the item. Additionally, as illustrated, a "negotiate" button 815 may be provided to allow the user to request that the listed price 809 of the item be negotiated by the system.

The social rank assigned to each item within the social shopping cart is calculated here as the difference between the positive endorsements (+s) and the negative feedback (−s) of the users with regard to the item, however, other feedback data such as votes, ratings, and comments may also be considered when calculating the social rank for each item. The items within the social shopping cart may be ranked according to the social ranking. This makes the decision making process more efficient where the user is able to make purchasing decisions based on how his/her contacts have responded to the item (e.g., based on the positive/negative feedback or endorsement of the item).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

IV. Example System for Facilitating a Social Shopping Experience

Figure 9:
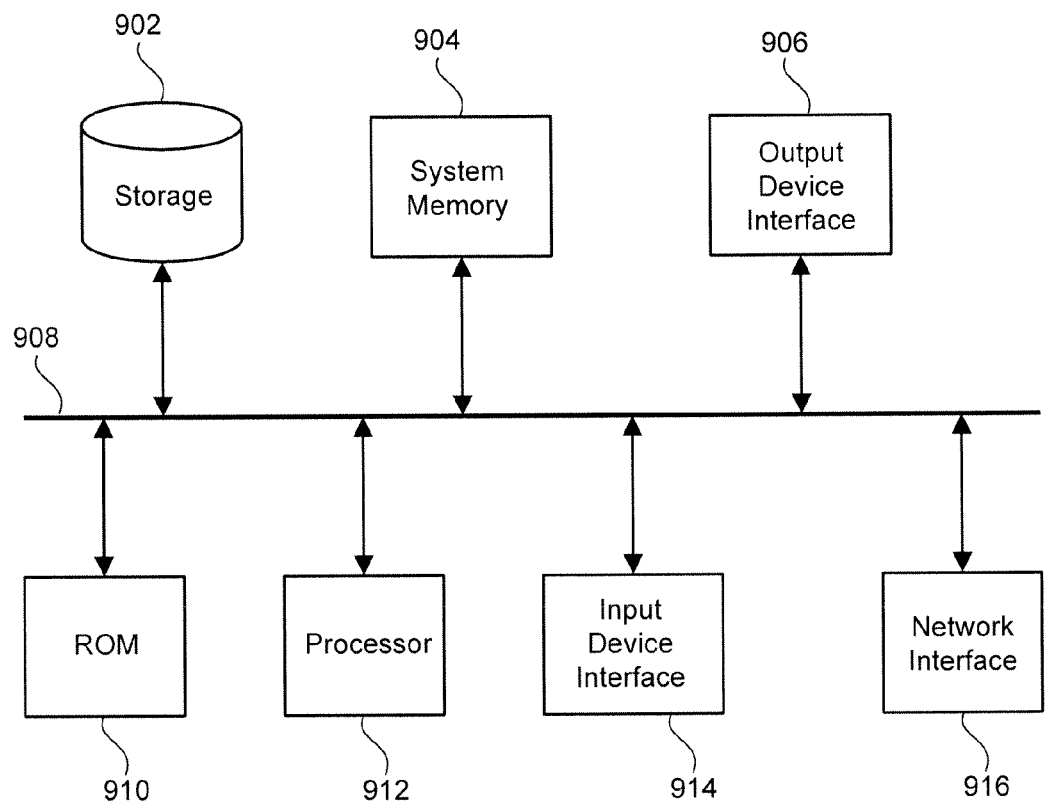
FIG. 9 conceptually illustrates an electronic system with which some implementations of the subject technology are implemented.

FIG. 9 conceptually illustrates an electronic system with which some implementations of the subject technology are implemented. Electronic system 900 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and its corresponding disk drive) as permanent storage device 902. Like permanent storage device 902, system memory 904 is a read-and-write memory device. However, unlike storage device 902, system memory 904 is a volatile read-and-write memory, such a random access memory. System memory 904 stores some of the instructions and data that the processor needs at runtime. In some implementations, the processes of the subject disclosure are stored in system memory 904, permanent storage device 902, and/or ROM 910. For example, the various memory units include instructions for facilitating a social shopping experience. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and select commands to the electronic system. Input devices used with input device interface 914 include, for example, alphanumeric keyboards and pointing devices (also called "cursor control devices"). Output device interfaces 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that functions as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), or an Intranet, or a network of networks, such as the Internet. Any or all components of electronic system 900 can be used in conjunction with the subject disclosure.

These functions described above can be implemented in digital electronic circuitry, in computer software, firmware or hardware. The techniques can be implemented using one or more computer program items. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium or digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that all illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software item or packaged into multiple software items.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other headings and all features under one heading need not be used together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method executed by one or more computing devices for providing one or more participants of a social shopping trip with recommendations, the method comprising:
    analyzing, using the one or more computing devices, context information regarding a social shopping trip, wherein the context information includes information regarding the types of items related to the social shopping trip as identified by one or more of the participants;
    analyzing, using the one or more computing devices, one or more items posted to the social shopping trip by one or more participants of the social shopping trip, including analyzing the characteristics of the one or more items and feedback data relating to the one or more items provided by the one or more participants;
    determining, using the one or more computing devices, one or more item characteristics associated with the social shopping trip based on results of analyzing the context information and the one or more items;
    generating a listing of one or more recommended items which are obtained based on the one or more item characteristics, wherein the one or more recommended items are obtained via an electronic network from a remote service connected to the electronic network;
    providing the generated listing for display within a first window corresponding to the social shopping trip, wherein the first window is displayed together with a second window corresponding to an application separate from the social shopping trip, and wherein the first and second windows are formatted for adjacent display within a preset display area.

2. The method of claim 1, further comprising:
    providing the at least one recommended item of the listing for display to the one or more participants along with the one or more items.

3. The method of claim 2, further comprising:
    determining user feedback data associated with the at least one recommended item, the user feedback data including information regarding feedback provided by one or more users regarding the at least one recommended item; and
    providing the determined user feedback data for display to the user.

4. The method of claim 1, the process further comprising selecting the one or more recommended items of the listing based on comparing the characteristics associated with the one or more recommended items against the one or more item characteristics.

5. The method of claim 1, further comprising determining one or more stores that the one or more participants may be interested in visiting, the one or more stores offering the at least one of the one or more recommended items; and
    providing the determined one or more stores for display to the one or more participants.

6. The method of claim 1, determining one or more social shopping trips including at least one of the one or more recommended items; and
    providing an identified associated with each of the one or more social shopping trips for display to the one or more participants.

7. The method of claim 1, determining one or more social shopping carts including at least one of the one or more recommended items; and
    providing an identifier associated with each of the one or more social shopping carts for display to the one or more participants.

8. The method of claim 1, determining one or more users interested in joining the social shopping trip based on the one or more item characteristics; and
    providing a listing of users including the one or more users for display to the one or more participants.

9. The method of claim 1, further comprising:
    determining one or more user preferences associated with the one or more participants of the social shopping trip, the user preferences being determined based on shopping activities of the one or more participants with regard to one or more other social shopping trips,
    wherein the listing may include at least one recommended item selected based upon the one or more user preferences.

10. The method of claim 1, further comprising:
    identifying one or more similar social shopping trips; and
    determining information regarding the one or more similar social shopping trips,
    wherein the listing may include at least one recommended item selected based upon further based upon the information regarding the one or more similar social shopping trips.

11. The method of claim 10, wherein each of the one or more similar shopping trips is associated with one or more item characteristics similar to the item characteristics of the social shopping trip, or is associated with at least one of the one or more participants of the social shopping trip.

12. The method of claim 1, further comprising:
    identifying one or more similar users as the one or more participants of the social shopping trip;
    determining one or more user preferences associated with the similar users, the user preferences being determined based on shopping activities of the one or more similar users with regard to one or more social shopping trips,
    wherein the listing may include at least one recommended item selected based upon the one or more user preferences of the similar users.

13. The method of claim 12, wherein the one or more similar users include users that have one or more demographic information corresponding to at least one of the one or more participants or one or more of the user preferences corresponding to at least one of the one or more participants.

14. The method of claim 12, further comprising determining one or more items associated with one or more similar users, wherein the listing includes at least one of the one or more items associated with the one or more similar users.

15. The method of claim 1, further comprising:
identifying, using the one or more computing devices, one or more social shopping carts associated with the one or more participants of the social shopping trip; and
analyzing activity within the identified one or more social shopping carts, wherein the activity comprises one or more of adding items to the social shopping cart, removing items from the social shopping cart or requesting to purchase an item form the social shopping cart,
wherein the listing may include at least one recommended item selected based upon the one or more item characteristics determined based on analyzing the activity within the identified one or more social shopping carts.

16. The method of claim 1, further comprising:
identifying at least one of the one or more items or one or more recommended items having a first price; and
identifying, using the one or more computing devices, a second store offering the at least one of the one or more items or one or more recommended items for a price lower than the first price; and
wherein the listing includes at least one of the one or more items from the second store.

17. The method of claim 1, further comprising:
determining a group offer for at least one of the one or more items or one or more recommended items based on the number of participants within the social shopping trip; and
providing the group offer for display to the one or more participants.

18. The method of claim 1, wherein the one or more item characteristics include one or more of an item type, item category, item color, size range, price range, store, or store type.

19. The method of claim 1, further comprising:
assigning the generated listing to a single tab within a tabbed interface of the social shopping trip application, based on the context information,
wherein providing the generated listing comprises providing the generated listing for display within the single tab.

20. The method of claim 1, further comprising:
identifying, prior to analyzing the one or more items, the one or more items posted to the social shopping trip by one or more of the participants of the social shopping trip,
wherein for each of the one or more items, the item is posted to the social shopping trip by
determining a uniform resource locator (URL) corresponding to the item when viewed by the respective participant, and
sending, via the electronic network, the URL to an item search service connected to the electronic network, to obtain the characteristics of the item.

21. A system for providing one or more participants of a shopping trip with item recommendations based on a social shopping trip, the system comprising:
one or more processors; and
a machine-readable medium comprising instructions stored therein, which when executed by the processors, cause the processors to perform operations comprising:
analyzing context information regarding a social shopping trip, wherein the context information includes information regarding the types of items related to the social shopping trip as identified by one or more of the participants;
analyzing one or more items posted to the social shopping trip by one or more participants of the social shopping trip, the analyzing including analyzing the characteristics of the one or more items and feedback data relating to the one or more items provided by the one or more participants;
determining one or more item characteristics corresponding to the social shopping trip based on results of analyzing the context information and the one or more items;
generating a listing of one or more recommendations which are obtained based on the one or more item characteristics, wherein the one or more recommendations are obtained via an electronic network from a remote service connected to the electronic network; and
providing the generated listing for display within a first window corresponding to the social shopping trip, wherein the first window is displayed together with a second window corresponding to an application separate from the social shopping trip, and wherein the first and second windows are formatted for adjacent display within a preset display area.

22. The system of claim 21, wherein the recommendations comprises at least one of one or more recommended items, one or more recommended stores, one or more recommended social shopping trips, or one or more recommended social shopping carts.

23. The system of claim 21, further comprising:
determining one or more user preferences associated with the one or more participants of the social shopping trip, the user preferences being determined based on shopping activities of the one or more participants with regard to one or more other social shopping trips,
wherein the one or more recommendations are determined further based upon the one or more user preferences.

24. A non-transitory machine-readable medium comprising instructions stored therein, which when executed by a machine, cause the machine to perform operations comprising:
analyzing context information regarding a social shopping trip, wherein the context information includes information regarding the types of items related to the social shopping trip as identified by one or more of the participants;
analyzing one or more items posted to the social shopping trip by one or more participants of the social shopping trip, the analyzing including analyzing the characteristics of the one or more items and feedback data relating to the one or more items provided by the one or more participants;
determining one or more item characteristics corresponding to the social shopping trip based on results of analyzing the context information and the one or more items;
generating a listing of one or more recommendations which are obtained based on the one or more item characteristics, wherein the one or more recommendations are obtained via an electronic network from a remote service connected to the electronic network; and
providing the generated listing for display within a first window corresponding to the social shopping trip, wherein the first window is displayed together with a second window corresponding to an application separate from the social shopping trip, and wherein the first and second windows are formatted for adjacent display within a preset display area.

25. The non-transitory machine-readable medium of claim 24, the operations further comprising:
   determining one or more user preferences associated with the one or more participants of the social shopping trip, the user preferences being determined based on shopping activities of the one or more participants with regard to one or more other social shopping trips,
   wherein the one or more recommendations are determined further based upon the one or more user preferences.

26. The non-transitory machine-readable medium of claim 24, wherein the recommendations comprise at least one of one or more recommended items, one or more recommended stores, one or more recommended social shopping trips, or one or more recommended social shopping carts.

* * * * *